United States Patent
Thompson

(10) Patent No.: US 9,801,359 B2
(45) Date of Patent: Oct. 31, 2017

(54) AQUACULTURE BASKET CLIP AND LINE PROTECTOR

(71) Applicant: Seapa Pty Ltd, Edwardstown (AU)

(72) Inventor: Garry Thompson, Edwardstown (AU)

(73) Assignee: Seapa Pty Ltd, Edwardstown (AU)

( * ) Notice: Subject to any disclaimer, the term of this patent is extended or adjusted under 35 U.S.C. 154(b) by 111 days.

(21) Appl. No.: 14/102,030

(22) Filed: Dec. 10, 2013

(65) Prior Publication Data
US 2015/0159731 A1    Jun. 11, 2015

(51) Int. Cl.
| | | |
|---|---|---|
| *A01K 61/00* | (2017.01) | |
| *F16G 11/02* | (2006.01) | |
| *F16B 2/00* | (2006.01) | |
| *A01K 61/55* | (2017.01) | |
| *A01K 61/54* | (2017.01) | |
| *H02G 7/05* | (2006.01) | |
| *F16B 2/20* | (2006.01) | |
| *F16B 2/08* | (2006.01) | |

(52) U.S. Cl.
CPC ............ *A01K 61/002* (2013.01); *A01K 61/54* (2017.01); *A01K 61/55* (2017.01); *F16B 2/08* (2013.01); *F16B 2/20* (2013.01); *F16G 11/02* (2013.01); *H02G 7/05* (2013.01); *Y10T 24/34* (2015.01); *Y10T 24/44* (2015.01)

(58) Field of Classification Search
CPC ...... A01K 61/002; A01K 61/54; A01K 61/55; H02G 7/14; F16L 59/024; Y10T 24/34; Y10T 24/44; F16G 11/02; F16B 2/08; F16B 2/20

USPC .... 248/56, 62, 65, 64.1, 58, 63, 74.2, 316.1, 248/316.7, 317; 174/42; 119/201, 238, 119/239, 240; 24/115, 305
See application file for complete search history.

(56) References Cited

U.S. PATENT DOCUMENTS

| | | | | |
|---|---|---|---|---|
| 4,011,397 | A * | 3/1977 | Bouche | H02G 7/14 174/42 |
| 4,134,574 | A * | 1/1979 | Jean | H01B 17/22 254/134.3 R |
| 4,971,268 | A * | 11/1990 | Dobrowski | B64D 37/32 244/135 R |
| 5,950,970 | A * | 9/1999 | Methany | F16F 7/14 248/150 |
| 6,135,398 | A * | 10/2000 | Quesnel | H02G 7/053 248/74.1 |
| 6,241,199 | B1 * | 6/2001 | Ismert | F16L 59/024 248/56 |
| 6,511,249 | B2 * | 1/2003 | Pelofi | A62B 35/0056 403/222 |
| 6,892,990 | B2 * | 5/2005 | Pisczak | H02G 7/053 248/62 |
| 8,020,516 | B2 * | 9/2011 | Labra Reynolds | A01K 61/002 119/238 |
| 2011/0220032 | A1 * | 9/2011 | Pendergrast | A01K 61/002 119/201 |

\* cited by examiner

*Primary Examiner* — Tan Le
(74) *Attorney, Agent, or Firm* — Eagar & Martin Pty Ltd

(57) ABSTRACT

Disclosed is a protector for a clip and line used to suspend aquaculture baskets or like equipment in water. In particular, the protector provides a sacrificial element between the clip and the line that is cheap to manufacture and easy to replace. While an application of the present invention is in oyster cultivation, it could equally well be applied to any process involving the line suspension of an article in water.

5 Claims, 7 Drawing Sheets

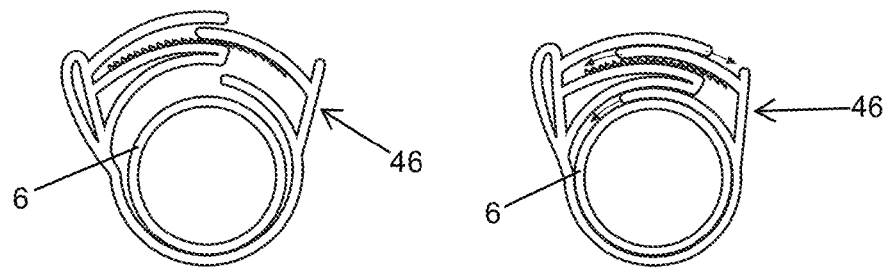
*Fig 9a*  *Fig 9b*
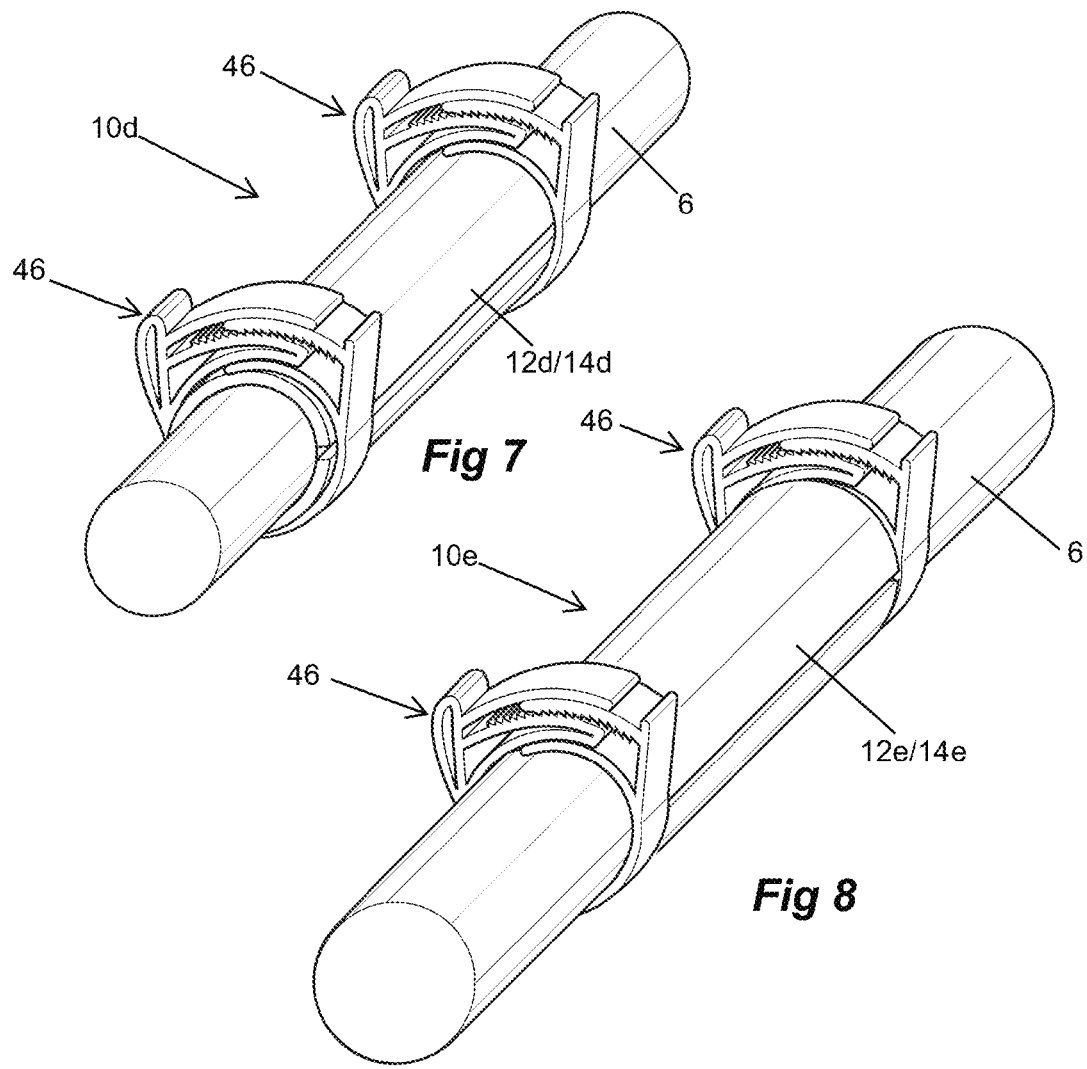
*Fig 7*
*Fig 8*

AQUACULTURE BASKET CLIP AND LINE PROTECTOR

The present invention relates to a protector for a clip and line used to suspend aquaculture baskets or like equipment in water. In particular, the protector provides a sacrificial element between the clip and the line that is cheap to manufacture and easy to replace. While an application of the present invention is in oyster cultivation, it could equally well be applied to any process involving the line suspension of an article in water.

BACKGROUND OF THE INVENTION

It is common for molluscs such as oysters to be grown on a commercial scale in artificial environments in early stages of growth. Typically, the stock is then transferred to sea environments for what is known as "grow out". Cultivation of oysters is accomplished by initially growing the lava in special tanks until they reach a juvenile size when they can be transferred to containers in intertidal or sub-tidal sites. Typically, the containers are in the form of baskets having perforated walls which enable water to flow through the baskets where the oysters use the water flow to obtain nutrients from the water as well as flushing impurities away.

In adjustable long line oyster cultivation, the baskets are typically suspended from lines that extend for hundreds of metres with multiple lines being attached in a parallel configuration according to an embodiment. These lines are typically made up of tensioned monofilament with a protective sheath or "drip tube" over the monofilament to reduce wear. Posts are used to support the tensioned line and are typically spaced at intervals along the line to allow for at least one basket to be suspended between adjacent posts. The drip tube typically extends the full length of the line. Special clips are used to attach the baskets to the drip tube, and can be attached both along the line (parallel arrangement) or across pairs of lines (perpendicular arrangement).

It has been recognised more recently that placing baskets in rougher waters can improve the growth of oysters. However, more aggressive water conditions have brought about problems not previously encountered in calmer water conditions. Most notably, it has been found that the clips used to rotatably attach the oyster baskets to the drip tubes are wearing, as are the drip tubes in areas where the clips attach. In rougher waters, it is not uncommon for clips and hence baskets to slide back and forth along the drip tube and collide with the support posts. Baskets have also been known to perform full 360 degree rotations about the line. This often results in winding of the drip tube and can also have adverse effects when, for example, winding occurs in opposite directions at opposite ends of the drip tube.

FIG. 1 illustrates an example of a known clip 2 including at one end a means of rotatable attachment 4 to an oyster basket and at the other end a means of rotatable attachment 5 to a drip tube 6 which acts as a protective sheath for the line 7. The rotatable attachment 5 is simply a hook means with an opening of sufficient size to receive the tube when the hook is forced down on the tube and to maintain the tube therein. The result is that the clip is slideable along the tube, but not easily removable unless the clip is forced in a direction away from the line. It is the areas indicated by reference numeral 8 on the clip and reference numeral 9 on the drip tube which would typically wear and render the clips and tubes unusable over time. The attachment portion 5 of the clip is such that the drip tube 6 needs to be secured therein, but when this part is sufficiently worn, the tube 6 can easily become detached from the clip.

The skilled addressee would understand the expense and labour that is required to replace these clips, and moreso to have to remove clips and baskets suspended on a line to enable a full replacement of the line.

It is therefore an object of the present invention to alleviate some of the aforementioned problems, or at least provide the public with a useful alternative.

SUMMARY OF THE INVENTION

In one aspect, the present invention provides a clip and line protector for use in aquaculture environments in which an article such as an oyster basket is rotatably suspended, via one or more clips, from a support line, said protector including a sacrificial element interposed between said clip and said line such that during rotation of the one or more clips about the line only the sacrificial element experiences frictional wear.

The skilled addressee would thus realise the only moving components are the clip and the sacrificial bearing element about the line, so the only component that will wear is the sacrificial bearing element which can be cheaply and easily replaced.

In an embodiment, the support line is a monofilament line supported along a plurality of support posts, and said sacrificial element is a length of protective sheath or drip tube extending between two adjacent line support posts in rotatable engagement with the line, the basket clip adapted to engage the drip tube.

In an alternate embodiment, the clip and line protector further includes an attachment portion in the form of a cylindrical sleeve adapted to be fitted directly to the line or protective sheath therefor, the basket clip adapted to engage the sleeve.

In an embodiment, said sleeve is dimensioned to be a snug fit on the line such that the sleeve does not slide.

In an embodiment, said sleeve includes a waterproof adhesive on its inner surface for locking the sleeve to the line.

In a further alternate embodiment, said clip and line protector further includes an attachment portion in the form of a cylindrical sleeve adapted to be fitted directly to the line or protective sheath, wherein said sleeve forms an outer surface about which said sacrificial bearing element is adapted to rotate.

In an embodiment, said sleeve is dimensioned to be a snug fit on the line such that the sleeve does not slide.

In an embodiment, said sleeve includes a waterproof adhesive on its inner surface for locking the sleeve to the line.

In an embodiment, said sleeve includes raised end portions adapted prevent the sacrificial bearing element from sliding off the sleeve.

In a yet further alternate embodiment, said sacrificial element forms part of a basket clip assembly and includes a portion adapted to rotatably engage said line, said portion being detachable from said clip assembly.

In a further alternate embodiment, the clip and line protector further includes an attachment portion attachable to said line, wherein said clip is adapted to engage the sacrificial element which is journalled about said line such that the clip and sacrificial element rotatably engage the line.

In an embodiment, said attachment portion is substantially prevented from sliding along said line.

In an embodiment, said attachment portion is in the form of a clamp assembly including two clamp members which when assembled form a central internal channel for accommodating the support line or protective sheath therefor.

In an embodiment, said clamp members are attachable to form said clamp assembly by way of snap fit connection between one or more lugs and associated corresponding locking apertures.

In an embodiment, said clamp members are attached by a hinged connection and are lockable in the assembled closed position by a locking means.

In an embodiment, said clamp members are dimensioned such that when they are assembled, a mid-cylindrical portion is formed about which said sacrificial bearing element is adapted to rotate.

In an embodiment, said clamp members are dimensioned such that when they are assembled, circular wall portions are formed at opposed ends thereof, said wall portions adapted to prevent the sacrificial bearing element from sliding off the clamp assembly.

In an embodiment, the clamp assembly is manufactured from a durable material including rigid polyurethane.

In an embodiment, said sacrificial bearing element is manufactured from a flexible plastic or rubber material.

BRIEF DESCRIPTION OF THE DRAWINGS

The accompanying drawings, which are incorporated in and constitute a part of this specification, illustrate several implementations of the invention and, together with the description, serve to explain the advantages and principles of the invention. In the drawings:

FIG. 7 illustrates a perspective view of a clip and line protector according to a further embodiment;

FIG. 8 illustrates a perspective view of a clip and line protector according to a still further embodiment;

FIG. 9a illustrates an end view of a ratchet-type clamp for the clip and line protector of FIG. 8 in a disengaged configuration;

FIG. 9b illustrates an end view of a ratchet-type end clamp for the clip and line protector of FIG. 8 in an engaged configuration.

DESCRIPTION OF THE INVENTION

Figure 1:
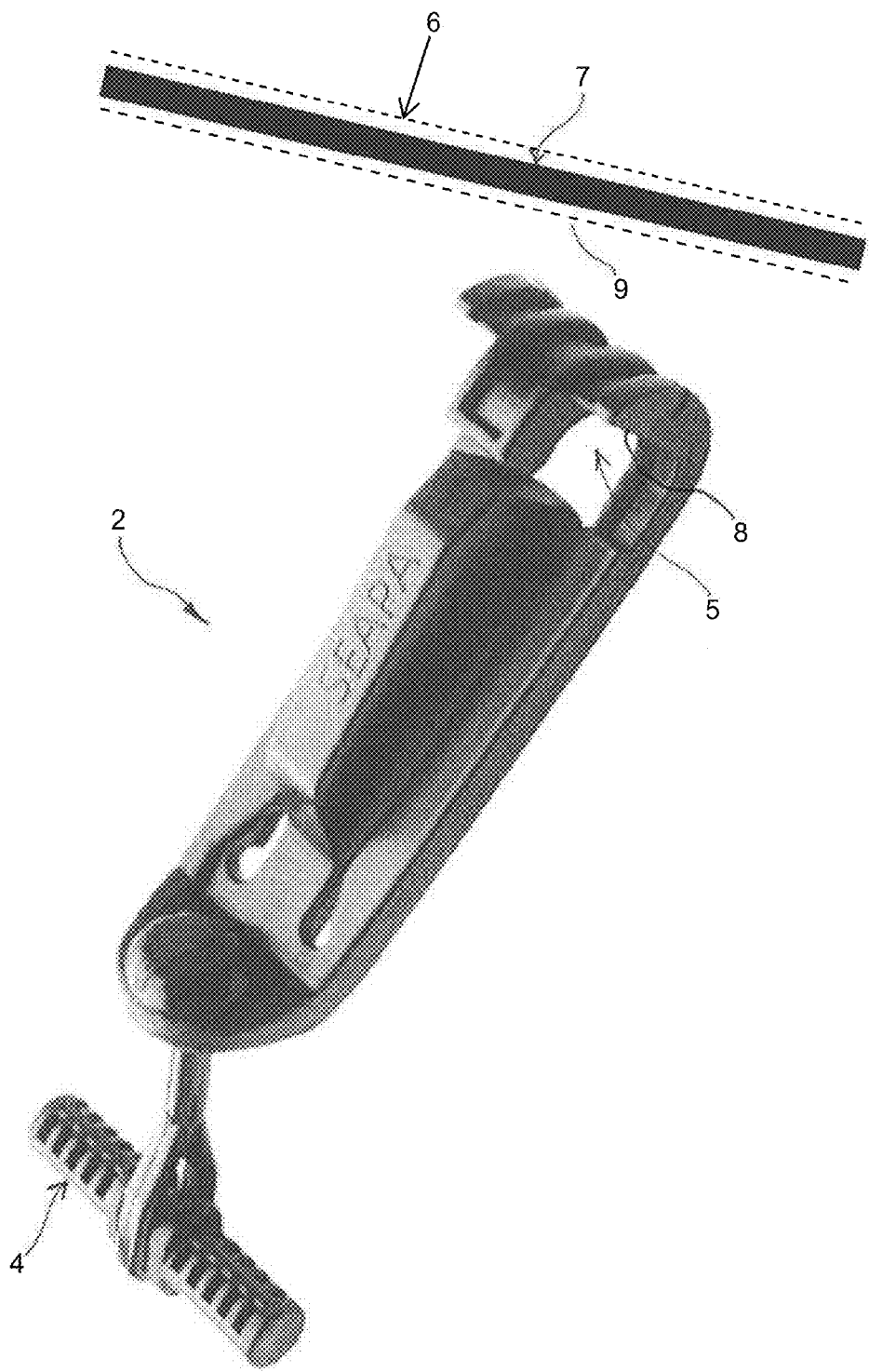
FIG. 1 illustrates a perspective view of a known clip and a line including a drip tube to which the clip is configured to be rotatably suspended.

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts. Dimensions of certain of the parts shown in the drawings may have been modified and/or exaggerated for the purposes of clarity or illustration.

The present invention relates to a clip and line protector 10 (embodied herein as 10a, 10b, 10c, 10d and 10e with other variations possible). In an embodiment, the protector 10 includes a means of attachment 12 to a suspension line or protective sheath for the line (often referred to as a drip tube) 6 and a means 14 of enabling a basket attachment clip, such as the known clip 2 shown in FIG. 1, to be rotatably coupled to the means of attachment 12 while preventing direct contact between the clip and the line. In a broader embodiment, the means 14 of enabling the basket attachment clip to be rotatably coupled to the line while preventing direct contact between the clip and line is configured for direct attachment to the line, i.e. the component 14 and the means of attachment 12 are one and the same. In an alternate embodiment, the means 14 of enabling the basket attachment clip to be rotatably coupled to the line forms part of the basket attachment clip.

The result is that the clip 2 and hence basket 16 suspended therefrom can still rotatably move in their intended manner, and in a manner which promotes oyster cultivation, but without the frictional wear on the line (or drip tube) or clip that existed when the clip was attached directly to the line (or drip tube). The skilled addressee would appreciate that in not having to replace the line, drip tube (if used), or basket attachment clip after they wear, the overall labour and cost to maintain an oyster cultivation farm is reduced.

In aspect further embodiment of the invention, the protector 10 also includes a means of preventing sliding movement of the clip along the line 6 so as to prevent the basket from moving back and forth along the line in more aggressive conditions.

Figure 2:
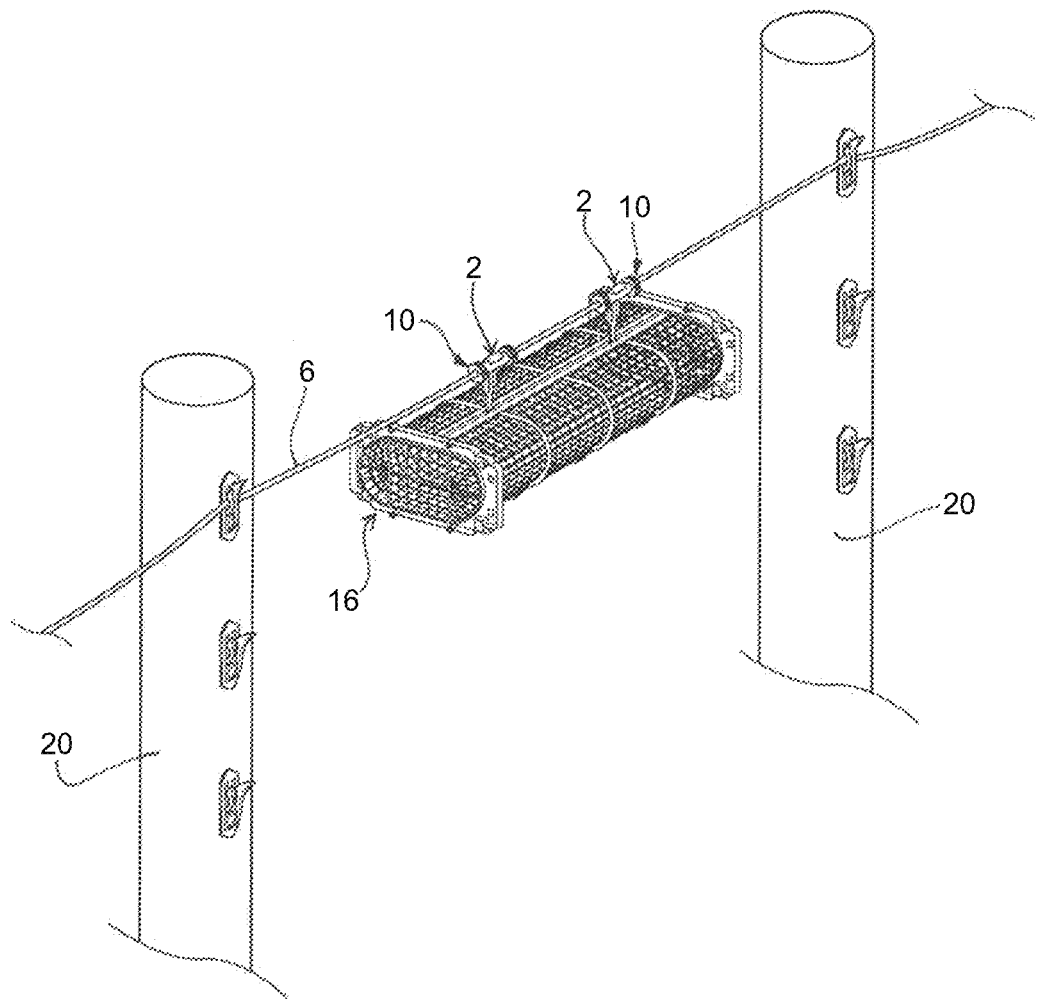
FIG. 2 illustrates a perspective view of an aquaculture basket suspended from a long drip tube using clips, and a clip and line protector according to an embodiment of the present invention.

FIG. 2 illustrates an example of a basket 16 being suspended from a drip tube 6 attached along its length to spaced apart support posts 20, and wherein two clips 2 are used and attached in a known manner to the top of the basket and coupled in the manner proposed in the present invention to the drip tube 6. It is to be understood that any one of the clip and line protectors 10a, 10b, 10c, 10d or 10e embodied herein could be used, as could any alternately designed protectors considered to fall within the scope of the invention.

Figure 3:
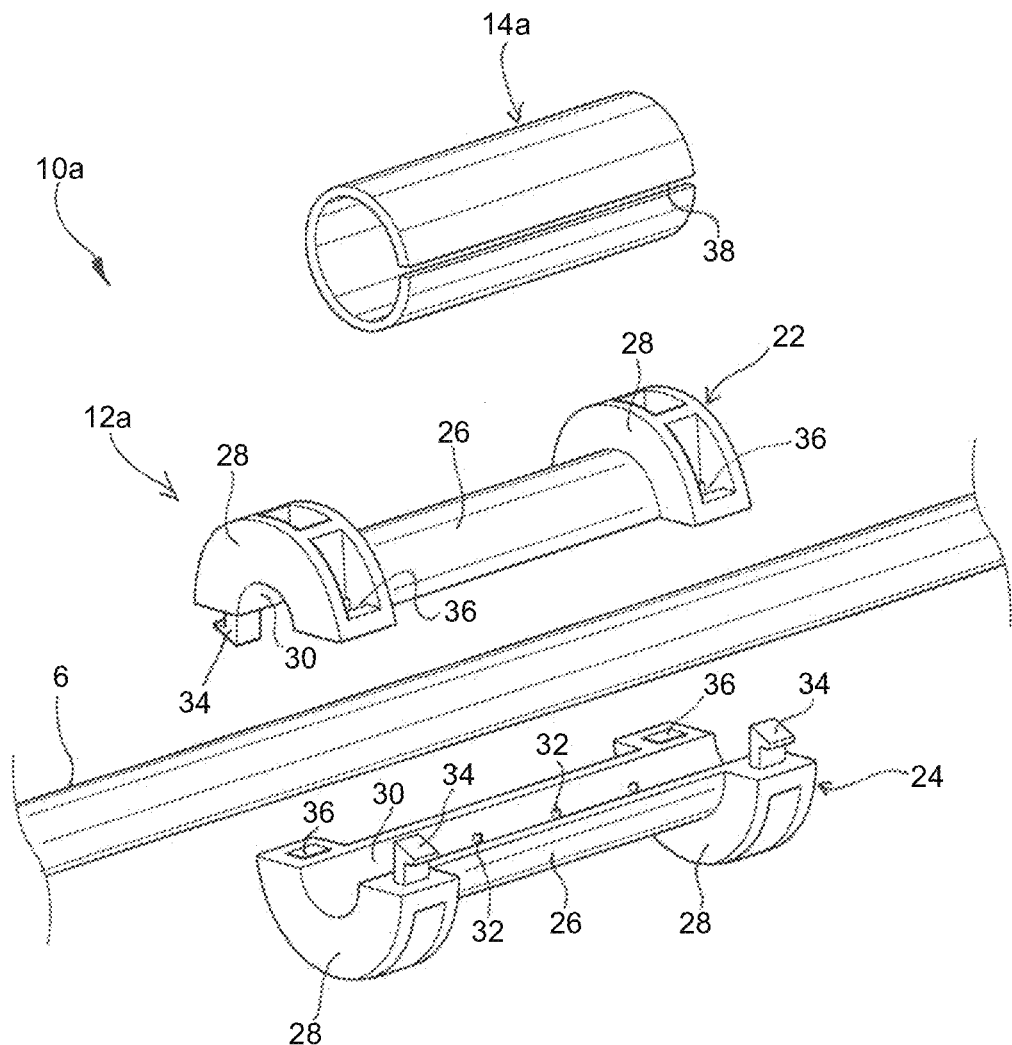
FIG. 3 illustrates an exploded perspective view of a clip and line protector according to an embodiment of the present invention.
Figure 4:
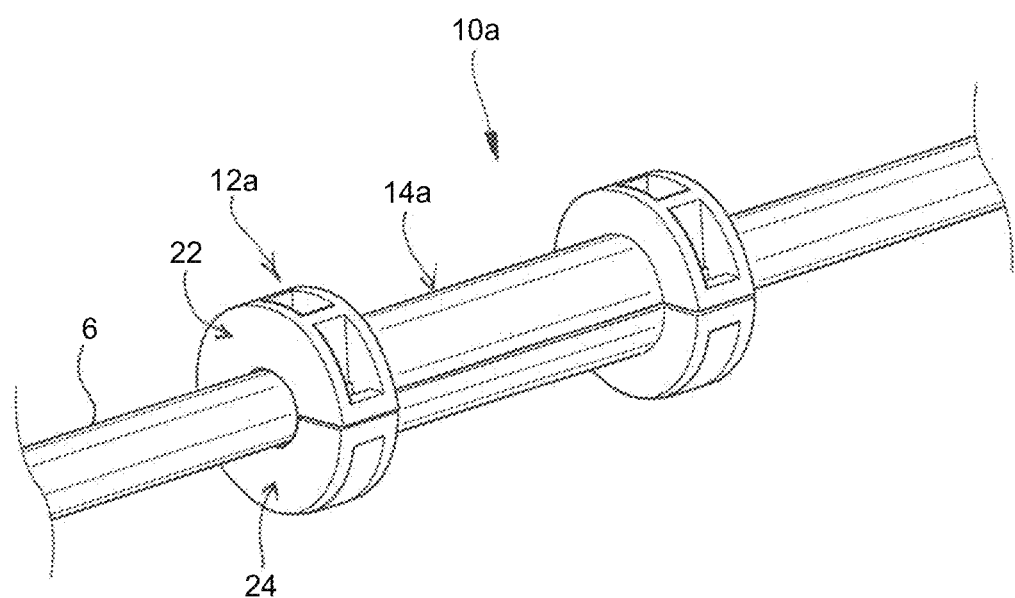
FIG. 4 illustrates an assembled view of the clip and line protector of FIG. 3 when attached to the line.

A protector 10a according to an embodiment is shown in FIGS. 3-4. As shown, the means of attachment to the tube may be in the form of a two-piece clamp 12a comprising a first clamp member 22 and a second clamp member 24 which each include an elongate semi-circular mid portion 26 and semi-circular end wall portions 28 of increased radial dimension to that of the mid portions 26. When the two clamp members 22 and 24 are assembled together, as shown in FIG. 4, they form a cylindrical mid portion and two circular end wall portions at ends thereof.

Each member 22 and 24 may include an internal semi-circular channel 30 respectively, which when assembled form an internal channel of circular cross section extending along the full length of the clamp 12a, the channel being of a size to accommodate the drip tube 6 (or monofilament line without drip tube, or any other type of supporting line). The internal surface of each channel 30 may be lined with gripping means 32 adapted to grip the tube 6 when the clamp is assembled and thereby prevent sliding movement of the clamp 12a along the tube. In the embodiment shown, these are in the form of rigid spikes protruding out from the internal surface of each channel 30, but other gripping means could be used. This may be an important feature in conditions where the movement of baskets along the lines is sought to be prevented, such as in rougher conditions where baskets have been known to collide with line support posts and also neighbouring baskets.

The first and second clamp members 22 and 24 may engage by way of a snap fit connection, and it can be seen in FIG. 3 how each of the semi-circular end wall portions 28 may include one locating lug 34 and one locking aperture 36 associated therewith. In an embodiment, the first and second clamp members 22 and 24 are identical for ease of manufacturing. The skilled addressee would realise that each lug 34 of one member will align with a locking aperture 36 of the other member, as shown in FIG. 3, and so each lug will be received and locked inside the opposed aperture by way of a snap fit. Snap fit connections are considered well known in the art, so the way in which the lug and locking aperture interact will not be described in detail. Each of the semi-circular end wall portions 28 include hollowed out bodies, not only to accommodate the lugs but also to reduce the amount of material used and hence the cost of manufacture.

In this embodiment, the means of enabling the clip 2 to be rotatably coupled to the clamp 12a while preventing direct contact between the clip 2 and the drip tube 6 is in the form of a sacrificial bearing element 14a. The sacrificial bearing element 14a is cylindrical in shape and substantially matches the shape of the cylindrical mid-portion of the clamp 12a.

The element 14a includes an open edge 38 so that it can be quickly and easily fitted over the cylindrical mid portion of the clamp 12, and is configured such that it journals around the mid portion and is freely rotatable.

Therefore, rather than the attachment portion 5 of the clip 2 being hooked over the tube 6, it is hooked over the sacrificial bearing element 14a, and the clip 2 and the bearing element 14a are free to rotate about the clamp together. A person skilled in the art would thus realise that the protector 10 forms a barrier between the clip 2 and the line or drip tube 6 such that neither component experiences friction caused by rotation and/or sliding of the clip along the tube. The result is that neither component will wear and thus require replacement. The only component which will require replacement is the sacrificial bearing element 14a, which can be manufactured very quickly and inexpensively. The present invention thus provides a labour and cost benefit to aquaculture farmers, among other benefits. In addition, the bearing element 14a is prevented from sliding motion along the tube by the circular end wall portions of the clamp 12a, meaning the bearing element 14a and hence the clip and basket are prevented from sliding along the line and impacting other baskets or posts.

Figure 5:
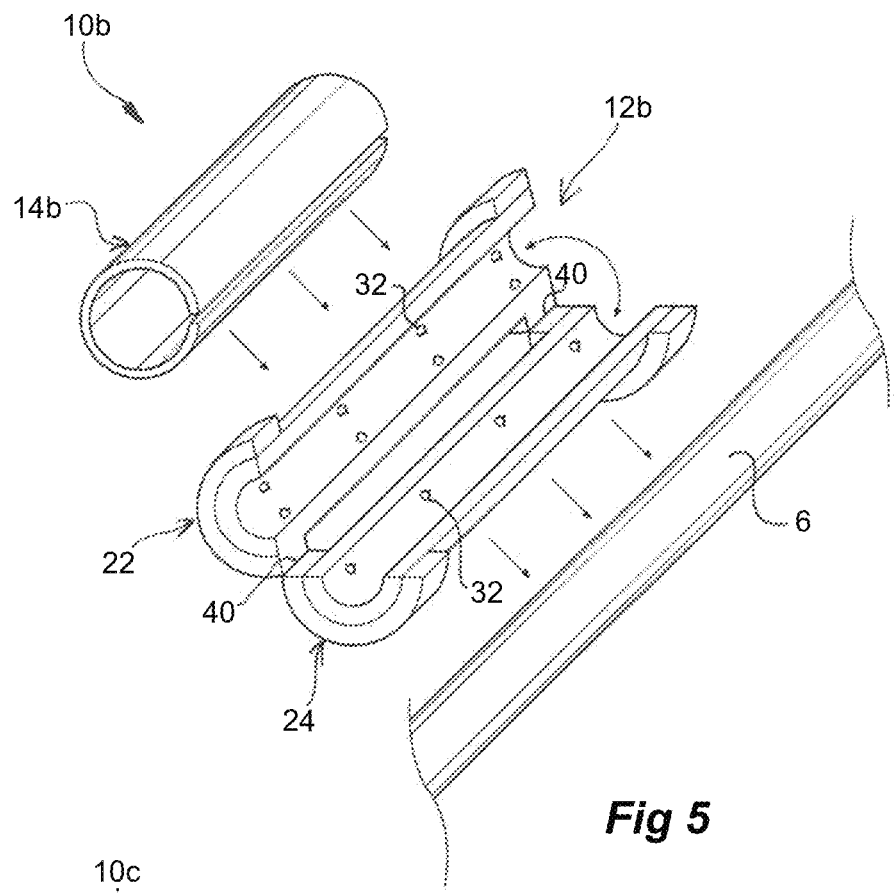
FIG. 5 illustrates an exploded perspective view of a clip and line protector according to an embodiment of the present invention.

Another embodiment 10b of the present invention is shown in FIG. 5 and demonstrates an alternate locking configuration between the first and second clamp members forming the clamp 12b, which although configured slightly differently are labelled once again as items 22 and 24 for the purpose of brevity. Rather than utilising a snap fit lock between the clamp members 22 and 24, the protector 10b according to this embodiment includes a hinged connection 40. The same sacrificial element is used and is referenced as 14b. Although not shown, the clamp members would also include a locking means for locking the clamp members together when in the "closed" position. For example, a ratchet type locking device (as seen in the embodiment of FIG. 8 for example) could be used. Aside from the alternate connection between clamp members, the protector 10b works in the same way as protector 10a and so a description of like or similar features will not be repeated.

Figure 6:
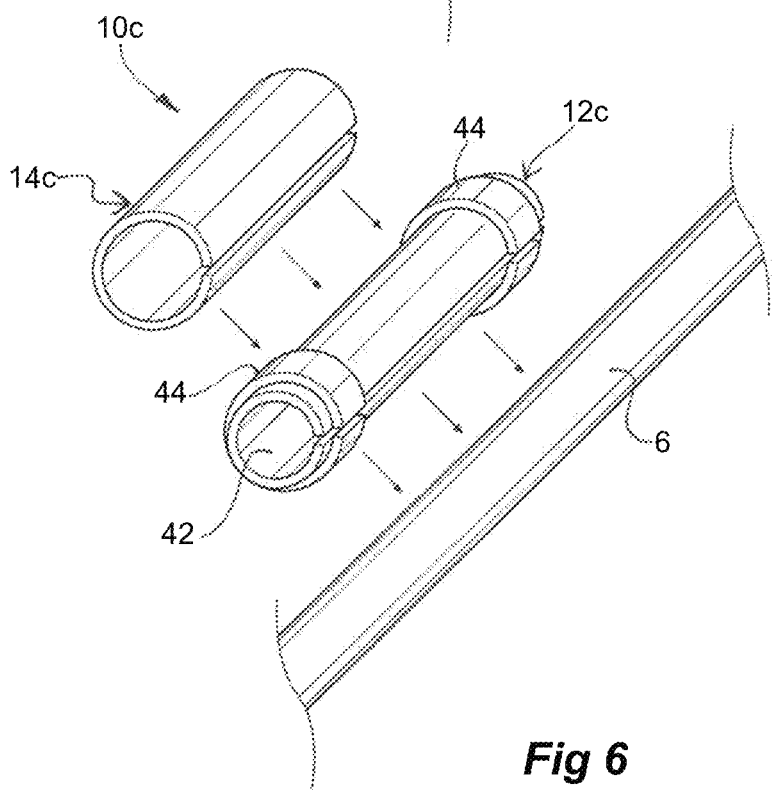
FIG. 6 illustrates an exploded perspective view of a clip and line protector according to an embodiment of the present invention.

A clip and line protector 10c, according to another embodiment of the present invention is shown in FIG. 6 and demonstrates an alternate means of attachment to the drip tube 6. Rather than utilising a rigid clamp, as per the previous embodiments, protector 10c uses a cylindrical sleeve 12c configured similarly to the sacrificial bearing element 14 in that it is an open edged cylindrical structure adapted to be fitted over the line. In an embodiment, the internal surface of the cylindrical sleeve 12c may include a suitable waterproof adhesive 42 or the like to ensure the sleeve 12c remains securely attached to the tube. In an embodiment, the adhesive may be such that the sleeve 12c can also be easily removed from the tube 6. In another embodiment, the material and durability of the sleeve is sufficient for it to be maintained around the line without the use of an adhesive.

The sleeve 12c may be constructed of a material which allows for rotation of the sacrificial bearing element 14c thereabouts. In such an embodiment, the sleeve 12c acts in the same way as the previously described clamps 12a and 12b, that is, to provide a secure surface along the tube 6 about which the sacrificial element and clip can rotate. The sleeve 12c may include raised portions 44 at opposed ends, as shown, which could be made of the same material as the sleeve, and which serve to prevent sliding of the sacrificial element.

In an alternate embodiment not illustrated, the protector could be formed by two clamp members which rather than being of an elongate construction and configured to close down on one another to effect engagement, include a groove permitting a twist/pivot lock to the support line.

It is to be understood that other embodiments are possible, including for example where rather than having two lockable components as per the first and second embodiments, the line protector is a one piece design.

For example, FIG. 7 illustrates a protector 10d in the form of a cylindrical sacrificial element 14d which also acts as the means of rotatable attachment 12d to the line. The rotatable attachment 5 of the basket clip shown in FIG. 1, for example, can be clipped over the sacrificial element and thus allowed to rotate with it about the line. Two spaced apart ratchet-type clamps 46 are clamped over the element 14d and may be tightened to an extent which prevents the element from sliding along the line, but still allows for the C-shaped insert's rotation about the line. Alternatively, the clamps could be tightened to an extent which prevent rotation of the sacrificial element, but then one would need to ensure the sacrificial element is made of a material that would not cause the basket clip to wear given that there would be frictional engagement between these two members. The clamps 46 may also act as end stops to prevent sliding of the basket clip beyond the ends of the C-shaped sacrificial element.

FIG. 8 illustrates a similar embodiment 10e but rather than the sacrificial element 14e being clamped to the line 6, it rotatably engages the line by its own properties and configuration. The sacrificial element again also acts as a rotatable attachment 12e to the line. The two clamp members 46 may still be used, as shown, act as end stops for preventing the element and/or the clamp from sliding along the line. A cross section of these clamps locking down on the line is shown in FIGS. 8a-8b In a further embodiment not shown, in which the line 7 does not include a drip tube, the sacrificial element 14d/14e could indeed be a length of drip tube extending between the two adjacent support posts.

Figure 10:
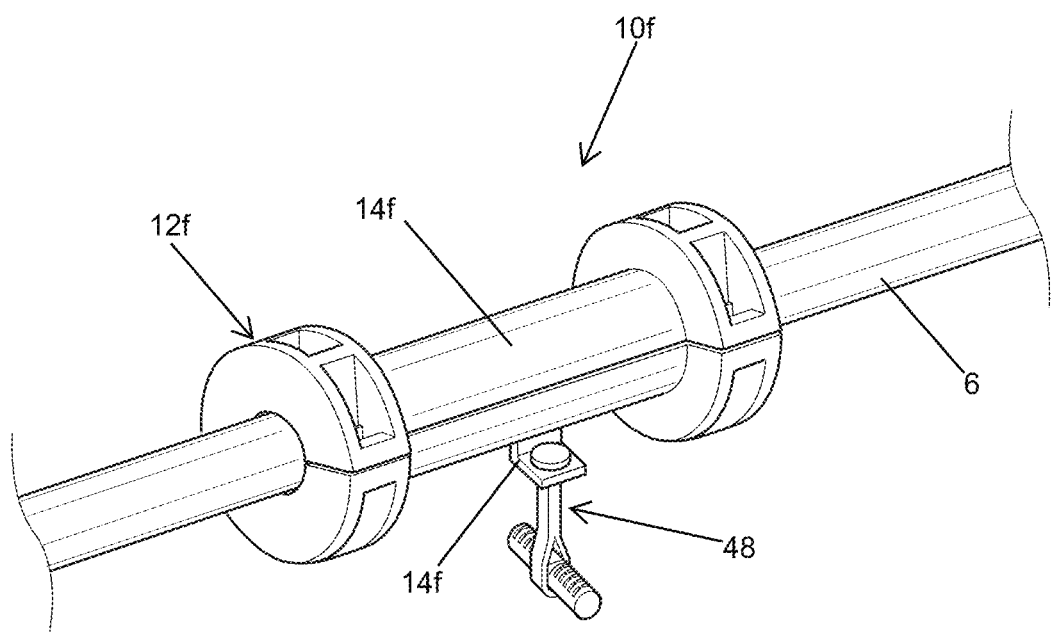
FIG. 10 illustrates a perspective view of a clip and line protector according to a further embodiment.

FIG. 10 illustrates a protector 10f according to a still further embodiment in which the sacrificial element 14f forms part of a basket clip assembly 48, the sacrificial element including a portion configured to rotatably journal directly about a support line, or around a surface of a clamp 12f as shown in the embodiment of FIG. 10. In this embodiment, the sacrificial element could be detachable from the basket clip so that it may be easily replaced.

It is to be further understood that other means of preventing sliding of the clip along the line or protective sheath than the means proposed herein could also be implemented.

Further advantages and improvements may very well be made to the present invention without deviating from its scope. Although the invention has been shown and described in what are conceived to be the most practical and preferred embodiments, it is recognized that departures may be made therefrom within the scope and spirit of the invention, which is not to be limited to the details disclosed herein but is to be accorded the full scope of the claims so as to embrace any and all equivalent devices and apparatus.

Throughout this specification and claims which follow, unless the context requires otherwise, the word "comprise", and variations such as "comprises" and "comprising", will be understood to imply the inclusion of a stated integer or step, or group of integers or steps, but not the exclusion of any other integer or step or group of integers or steps.

The reference to any prior art in this specification is not, and should not be taken as, an acknowledgement or any suggestion that the prior art forms part of the common general knowledge.

The invention claimed is:

1. A suspension clip and line protector for use in aquaculture environments, said protector comprising:
   a clamp including:
      a first end wall;
      a second end wall;
      a middle portion extending from said first end wall to said second end wall, each of said first and second end walls having an increased radial dimension relative to said middle portion; and
      a longitudinal channel extending through said first end wall, said middle portion and said second end wall, said channel having an inner surface to engage a support line, said inner surface being configured to inhibit sliding of the support line through said channel when said clamp is engaged with the support line; and
   a sacrificial element configured to fit over said clamp and rotate freely thereabout, said first and second end walls of said clamp being longitudinally spaced apart from one another to limit longitudinal movement of said sacrificial element along said clamp while permitting said sacrificial element to rotate freely about said clamp while said clamp is engaged with the support line; and
   wherein said sacrificial element is configured to be interposed between a suspension clip and said clamp such that said clip is configured to rotate freely about the clamp and wherein the suspension clip is part of a basket assembly.

2. The clip and line protector according to claim 1, wherein the channel includes a waterproof adhesive on its inner surface for locking the clamp to the line.

3. The clip and line protector according to claim 1, wherein said clamp includes upper and lower members attached by a hinged connection and lockable in an assembled closed position by a locking means.

4. The clip and line protector according to claim 1, wherein the clamp is manufactured from a durable material including rigid polyurethane.

5. The clip and line protector according to claim 1, wherein said sacrificial element is manufactured from a flexible plastic or rubber material.

* * * * *